2,833,769

THIAMIN SALTS

William E. Stieg, Mystic, Conn., assignor to Chas. Pfizer & Co., Inc., Brooklyn, N. Y., a corporation of Delaware No Drawing. Application June 21, 1955
Serial No. 517,085

3 Claims. (Cl. 260—256.6)

This invention is concerned with a novel process for the preparation of thiamin salts. In particular it is concerned with a valuable method for conversion of thiamin bromide hydrobromide to thiamin chloride hydrochloride, one of the forms commonly used in industry.

In the manufacture of thiamin or vitamin B1 by the common method used in large scale, commercial production, thiamin bromide hydrobromide is obtained as an intermediate. Certain methods have been developed for the conversion of this compound to the most commonly used substance or form in which the vitamin is marketed, that is, thiamin chloride hydrochloride. One method involves the use of silver chloride in hot water causing the formation of silver bromide which separates as a solid and the concurrent formation of thiamin chloride hydrochloride. This is obviously expensive and any loss in silver further adds to the expense of the process. A second method that has been used to some extent involves the application of ion-exchange resins. Thus, a solution of the thiamin bromide hydrobromide is contacted with a basic ion-exchange resin as the chloride salt to cause the conversion of the thiamin to the chloride hydrochloride. This process also had disadvantages requiring ion-exchange resins and specialized equipment for the use of this type of material.

The present application is a continuation-in-part of a copending application filed by the present inventor on April 28, 1954, under Serial No. 426,289, now abandoned. It has now been found that the process described in that application, that is, the reaction of thiamin bromide hydrobromide with a mineral acid, preferably hydrogen chloride, sulfuric acid or phosphoric acid, may most readily be conducted in a lower alkanol or lower aliphatic alcohol solvent from which the hydrobromic acid may be removed by distillation as the corresponding lower alkyl bromide. This distillation causes the desired reaction to go more nearly to completion resulting in many cases in an improved yield of the desired thiamin salt. Alternatively to the use of thiamin bromide hydrobromide the salt thiamin bromide may be used as starting material in operating the present process. The same procedure is used otherwise.

In the present novel process which has definite advantages over previous methods, thiamin bromide hydrobromide in a lower aliphatic alcohol solvent is treated with an acid such as anhydrous hydrogen chloride. A reaction ensues in which thiamin chloride hydrochloride is formed and a lower alkyl bromide is formed from the lower alkanol solvent. The process reaches an equilibrium at room temperature or at a lower temperature and it may be brought nearer completion by heating the mixture and distilling out the lower alkyl bromide that is thus formed. Despite the elevated temperature and strongly acid solution, appreciable yields of the desired thiamin salts are obtained.

The desired product, that is, thiamin chloride hydrochloride, may be isolated merely by cooling the reaction mixture. If a dilute solution of thiamin bromide hydrobromide has been utilized as starting material, some of the alkanol solvent may be removed by distillation and the residual mixture may then be cooled. The high purity, crystalline form of thiamin chloride hydrochloride is thus obtained. It is, of course, necessary to use good quality thiamin bromide hydrobromide as starting material in order to assure the formation of high purity thiamin chloride hydrochloride.

The present method has certain very distinct advantages. The product is isolated directly from the reaction mixture, merely requiring cooling and/or concentration. The bromine may be removed as a volatile compound making certain that the reaction is brought near completion. There is no contamination of the isolated product with bromide. As an alternative to the cooling and/or concentrating process, a solvent in which thiamin chloride hydrochloride has a slight solubility or no solubility may be added to the reaction mixture to induce the more complete formation of the chloride hydrochloride as a solid crystalline material.

The present process may also be utilized in the formation of certain other salts of thiamin, such as the sulfate or phosphate, in which case concentrated sulfuric acid or phosphoric acid is used rather than hydrogen chloride as described above. Although it was stated that anhydrous hydrogen chloride was used in the present process, a small amount of water may be present in the reaction mixture without seriously impeding the progress of the reaction. However, it should advisedly be kept to a minimum in order not to seriously increase the solubility of the thiamin salt in the reaction mixture. If sulfuric acid or phosphoric acid is utilized to form the corresponding salts, these materials should be concentrated acids to minimize the presence of the water which tends to solubilize the product. In general, it is necessary to use at least about one molecular proportion of the hydrogen chloride or other acid to which salt it is desired to convert the thiamin. In many cases, it may be found advisable to utilize an appreciable excess of the reagent in order to accelerate the reaction. For instance, when hydrogen chloride is utilized as the reagent, the excess material may be removed readily by heating the reaction mixture after the completion of the process. The reagent then distills out of the reaction mixture just as the lower alkyl bromide distills.

The following examples are given by way of illustration and are not to be regarded as a limitation of this invention, many variations of which are possible without departing from its spirit or scope.

Example I

Pure thiamin bromide hydrobromide weighing 25 grams was added to one liter of anhydrous methanol in which 80 grams of hydrogen chloride had been dissolved. The mixture was stirred and refluxed for four and one-half hours. The reaction mixture was then cooled to 0° C. with stirring. Thiamin chloride hydrochloride crystallized readily from the solution. The mixture was maintained for one hour at 0° C. and the product was filtered. It was washed with 50 to 100 mls. of cold anhydrous methanol and it was then dried in the air at about 60° C. A yield of about 10.8 grams of thiamin chloride hydrochloride was obtained. A further crop of the salt could be obtained by concentrating the methanolic mother liquor. The crystallized material from the first crop was found to be 99% pure by the U. S. Pharmacopoeia thiochrome assay method for thiamin chloride hydrochloride. It was found to contain 21.4% of hydrogen chloride and 1.8% of water. It assayed 98% pure by the thiamin reineckate salt method.

It was found that the completion of the reaction could be readily determined by removing a small sample and diluting with water. An equal volume of chlorine water is then added to the sample. Appearance of a brown color indicates the presence of the bromide ion, that is, the reaction has not yet been completed. Heating is then continued until a sample is checked and found to be completely reacted.

*Example II*

Pure thiamin bromide hydrobromide weighing 50 grams was added to 500 milliliters of anhydrous methanol containing 150 grams of anhydrous hydrogen chloride. The mixture was stirred and refluxed for about two hours. The mixture was then cooled to about 0° C. with thorough stirring. Thiamin chloride hydrochloride crystallized during the cooling. The mixture was maintained at 0° C. for eight hours and it was then filtered and washed with 50 milliliters of anhydrous cold methanol. The crystalline product was dried at 60° C. in air. It weighed 35.5 grams. The product was found to contain 21.6% of hydrogen chloride by the Volhard method. The theoretical amount is 21.6%. It was found to contain 0.7% of water by the Karl Fischer method. A reineckate salt assay showed the product to be 100% pure and this was confirmed by the U. S. P. thiochrome assay method. In other words the product was highest quality thiamin chloride hydrochloride.

*Example III*

Thiamin bromide hydrobromide weighing 50 grams was dissolved in 500 mls. of anhydrous methanol containing 100 grams of anhydrous hydrogen chloride. The reaction mixture was stirred and refluxed for about six hours. It was then cooled to 0° C. with stirring. The mixture was maintained at 0° C. for eight hours and the product was filtered. The crystalline thiamin chloride hydrochloride was washed with 50 to 100 mls. of cold anhydrous methanol and it was then dried in air at about 60° C. The product weighed 34 grams. It was found to be 98 to 100% pure thiamin chloride hydrochloride.

*Example IV*

Twenty-five grams of thiamin monobromide was added to 250 mls. of anhydrous methanol containing 75 grams of anhydrous hydrogen chloride. The mixture was placed in a flask through which a slow stream of nitrogen was passed. The mixture was heater at reflux for four and one-half hours. At that point the rate of flow of nitrogen was increased permitting most of the methanol vapor to pass up through the reflux condensor. The source of heat was removed from the reaction flask and 250 mls. of cold anhydrous methanol was added to the flask. The mixture was then stirred at room temperature for two hours. The flask was then placed in a refrigerator at 5° C. for 16 hours. The thiamin chloride hydrochloride that had separated was filtered, washed by suspension in cold methanol at 5° C. and again filtered. The product was dried at atmospheric pressure at 65° C. for 20 hours. Eighteen grams of thiamin chloride hydrochloride was obtained. This was found to contain 21.6% of chloride and was shown to be 99% thiamin by the thiochrome assay method.

What is claimed is:

1. A process for the preparation of a salt of thiamin selected from the group consisting of thiamin chloride, thiamin phosphate and thiamin sulfate which comprises contacting thiamin bromide hydrobromide in a lower aliphatic alcohol with an acid chosen from the group consisting of hydrogen chloride, phosphoric acid and sulfuric acid, and distilling from the reaction mixture an alkyl bromide formed from the lower aliphatic alcohol.

2. A process as claimed in claim 1 wherein the thiamin salt is recovered in solid form from the reaction mixture.

3. A process as claimed in claim 1 wherein thiamin bromide hydrobromide is treated with hydrogen chloride in methanol, methyl bromide is removed by distillation and crystalline thiamin chloride hydrochloride is separated from the residual reaction mixture.

References Cited in the file of this patent

FOREIGN PATENTS 5,429     Japan _____ Oct. 16, 1953